(12) United States Patent
Cresswell

(10) Patent No.: US 6,698,368 B2
(45) Date of Patent: Mar. 2, 2004

(54) ZONE CONTROL FOR AGRICULTURAL PRODUCT APPLICATION

(75) Inventor: Mark Cresswell, Saskatchewan (CA)

(73) Assignee: Bourgault Industries Ltd., Saskatchewan (CA)

( * ) Notice: Subject to any disclaimer, the term of this patent is extended or adjusted under 35 U.S.C. 154(b) by 62 days.

(21) Appl. No.: 09/970,833

(22) Filed: Oct. 4, 2001

(65) Prior Publication Data
US 2003/0070597 A1 Apr. 17, 2003

(51) Int. Cl.[7] .............................................. A01C 17/00
(52) U.S. Cl. ........................ 111/200; 111/904; 111/900; 111/130
(58) Field of Search ................................ 111/130, 903, 111/200, 119, 904, 118, 900; 172/1, 2; 239/1, 61, 63; 701/50; 382/113

(56) References Cited

U.S. PATENT DOCUMENTS

| | | | | |
|---|---|---|---|---|
| 4,630,773 A | * | 12/1986 | Ortlip | 239/1 |
| RE35,100 E | * | 11/1995 | Monson et al. | 111/130 |
| 5,913,915 A | * | 6/1999 | McQuinn | 701/50 |
| 5,919,242 A | * | 7/1999 | Greatline et al. | 701/50 |
| 5,931,882 A | * | 8/1999 | Fick et al. | 701/50 |
| 5,938,709 A | * | 8/1999 | Hale et al. | 701/50 |
| 5,978,723 A | * | 11/1999 | Hale et al. | 701/50 |
| 6,079,340 A | * | 6/2000 | Flamme et al. | 111/178 |
| 6,115,481 A | * | 9/2000 | Wiens | 382/113 |
| 6,236,907 B1 | * | 5/2001 | Hauwiller et al. | 700/283 |
| 6,434,258 B2 | * | 8/2002 | Wiens | 382/113 |

* cited by examiner

Primary Examiner—Victor Batson
(74) Attorney, Agent, or Firm—Frost Brown Todd LLC

(57) ABSTRACT

A method of applying a selected first combination of application rates of each of a plurality of crop inputs on a first zone in a field and applying a selected second combination of application rates of each of the crop inputs on a second zone in the field. The method comprises towing a seeding implement through the first zone in the field with metering devices adjusted to apply the first combination of application rates; visually judging when the seeding implement crosses a first boundary from the first zone to the second zone; and, by performing a single action, adjusting the metering devices to apply the second combination of application rates on the second zone.

22 Claims, 1 Drawing Sheet

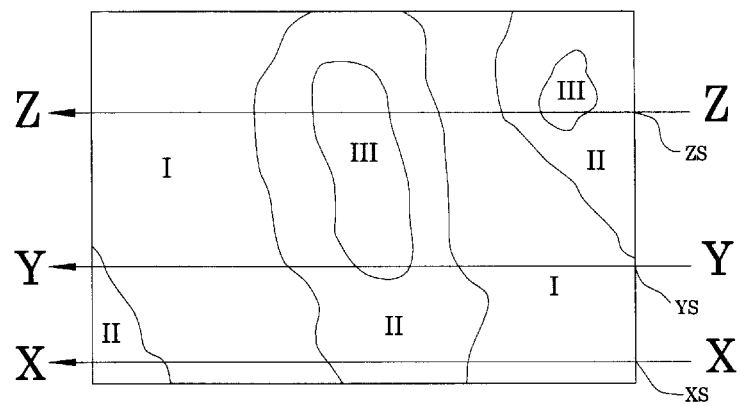
Fig. 1
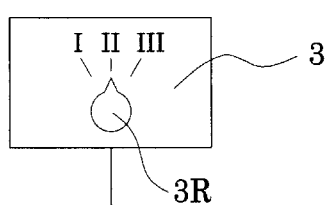
Fig. 2
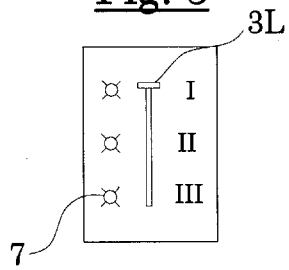
Fig. 3
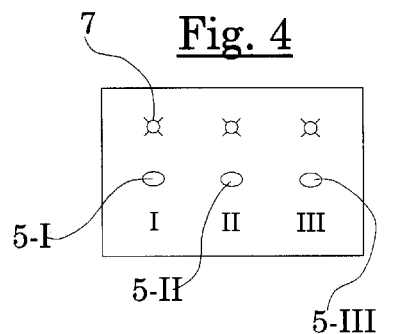
Fig. 4
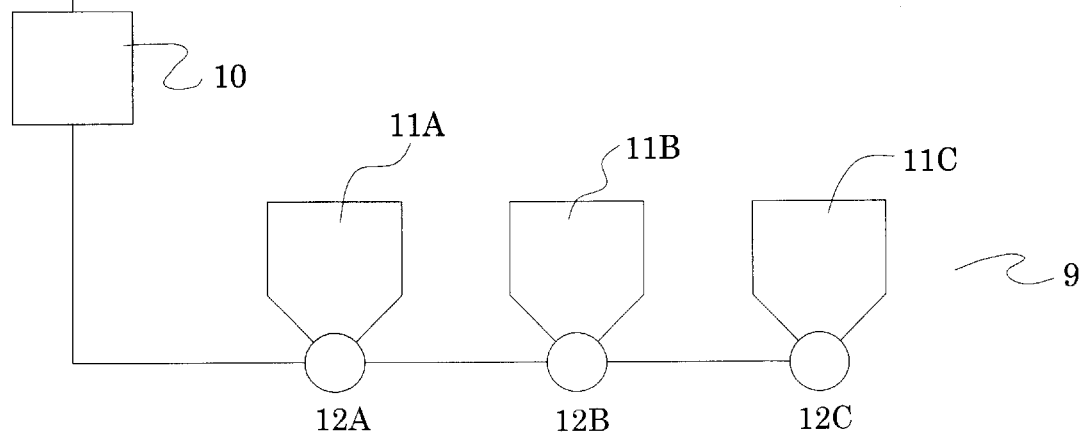

ZONE CONTROL FOR AGRICULTURAL PRODUCT APPLICATION

This invention is in the field of agricultural seeders and in particular such seeders wherein application rates of various crop inputs, such as seed, fertilizer, and herbicides, can be varied during operation.

BACKGROUND

Farmers are continually seeking to increase production while minimizing costs, in order to reduce the cost per unit of production, and thus increase production efficiency. A recent trend has been that of looking towards Global Positioning System (GPS) technology for location specific application of crop inputs such as seed, fertilizer and herbicide as a means of increasing, or at least maintaining production levels and crop quality while simultaneously reducing the amount of crop inputs and thus reducing input costs.

The site specific farming concept includes identifying the level of nutrients required in a specific area of a field and subsequently appropriately applying crop inputs in that area in order to optimize production. Air seeders have been developed that provide the ability to vary the application rate of two, three or more crop inputs while the seeder is moving through a field. This ability can be combined with GPS technology to automatically apply the optimum level of each input on the field as the seeder moves through field areas wherein that optimum level changes.

GPS based crop input application systems require considerable up front analysis work to provide the nutrient and seed recommendations for a crop, in a selected field, in relation to position in the field. The recommendations are determined using multiple sources of data and are provided to a farmer by a trained person, typically an agronomist. The agronomist generally uses specialized computer software along with multiple sources of data, some of which include combine yield and moisture data, soil sampling data, infrared satellite imagery and topographical maps.

The agronomist determines and provides to a farmer a computer disk with a crop input prescription that sets out the levels of crop inputs for the different similar areas or "zones" in each of the fields. The information on the disk is then loaded into a computer that also receives location information from a GPS receiver and in turn communicates with systems for varying the application or metering rates for the various inputs carried by the air seeder cart.

The early stages of variable rate technology included bump (up or down) switches for controlling a metering device so the operator can increase or decrease the application rates of the crop input products on-the-go. These typically allow an operator to set the "normal" application rate at, for example 50 pounds per acre (lb/ac), and while moving along the field, to increase the rate to 60 pounds per acre, or decrease the rate to 40 pounds per acre. Operation of such a bump switch for a single metering device and crop input can be accomplished manually, however where two or three bump switches are employed for a like number of inputs, manually keeping track of each input is not practical.

Essentially the same principle has been refined in presently available variable rate monitor/control systems for air seeders, which typically carry at least two, and often three or more crop inputs, each in a separate tank with its own metering device. These systems allow the operator to predetermine different combinations of crop inputs and access these through a layered menu system. Rates can be selected to provide a plurality of rate "combinations", for example as follows for three tanks and their associated inputs A, B, and C:

|  | Input A | Input B | Input C |
| --- | --- | --- | --- |
| Combination I | 70 lb/ac | 60 lb/ac | 80 lb/ac |
| Combination II | 60 lb/ac | 50 lb/ac | 100 lb/ac |
| Combination III | 80 lb/ac | 70 lb/ac | 120 lb/ac |

Typically to change from one combination to another in present systems, the operator is required to make three menu selections by pressing three different places on a controller screen. This renders them cumbersome and impractical for making frequent rate changes on the go manually without the GPS mapping and control. Present systems are essentially a step in between conventional application and GPS controlled systems, and are designed primarily so that farmers can build a GPS system by purchasing the required building blocks separately.

GPS based systems are costly and complex. Considerable care must be taken to ensure the data is correct, and many farmers do not have a satisfactory understanding of the technology, and so are reluctant to accept it. Often it is desirable to make last minute changes in cropping plans due to markets, weather, or the like. Farmers who are not comfortable with the technology will require technical assistance from an agronomist. In the narrow window of time preferred for planting most crops, such technical assistance may be difficult to find on a timely basis, and the farmer may not be able to make the desired changes.

GPS application systems have not been widely accepted, perhaps due in part to the aging farm population. Older farmers are less familiar with computers and what they can do, and with only a limited number of years left in their careers are often willing to forego the benefits of varying crop input application rates primarily because of the complexity of the systems. The cost of the system would also be a major consideration.

SUMMARY OF THE INVENTION

It is an object of the present invention to provide a method of applying different selected combinations of application rates of crop inputs on different zones in a field.

It is a further object of the present invention to provide such a method that is less expensive than presently available methods, and is simple and intuitive to practice for an experienced farmer.

The present invention provides a method of applying a selected first combination of application rates of each of a plurality of crop inputs on a first zone in a field with a seeding implement, and applying a selected second combination of application rates of each of the crop inputs on a second zone in the field with the seeding implement, the seeding implement carrying a plurality of crop inputs and including a metering device for each crop input that is adjustable to vary the application rate of the respective crop input. The method comprises towing the seeding implement through the first zone in the field with the metering devices adjusted to apply the first combination of application rates; visually judging when the seeding implement crosses a first boundary from the first zone to the second zone; and, by performing a single action, adjusting the metering devices to apply the second combination of application rates on the second zone.

In a second aspect the invention provides a method of applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input. The method comprises towing the seeding implement through the first zone in the field with the metering devices adjusted to apply the first combination of application rates on the first zone; visually judging when the seeding implement crosses a first boundary from the first zone to the second zone; moving a selector switch from a first switch position to an adjacent second switch position to adjust the metering devices to apply the second combination of application rates on the second zone; visually judging when the seeding implement crosses a second boundary from the second zone to the third zone; and moving the selector switch from the second switch position to an adjacent third switch position to adjust the metering devices to apply the third combination of application rates on the third zone.

In a third aspect the invention provides an apparatus for applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input. The apparatus comprises a selector switch operative to adjust the metering devices, the selector switch movable from a first switch position wherein the metering devices are adjusted to apply the first combination of application rates, to an adjacent second switch position wherein the metering devices are adjusted to apply the second combination of application rates, and movable from the second switch position to an adjacent third switch position wherein the metering devices are adjusted to apply the third combination of application rates.

The inventor has devised a method and apparatus that allows the farmer to conveniently vary the application rate of a plurality of crop inputs with a single action. The apparatus makes it practical for the farmer to use his experience to identify similar zones within a field, and then use the apparatus of the invention to manually select the proper combination of crop inputs for each zone with a single action. The system is also very economical, since it can readily be adapted to existing conventional air seeders having variable rate metering devices and control systems for monitoring and controlling application rates of multiple crop inputs carried by the air seeder cart.

The correct formula for each zone is based on current and historical soil tests, combined with the experience and knowledge of the farmer and his intuition as to what would be best for a given year, taking into account things like date of seeding, moisture levels, long term weather forecasts, crop prices, and so forth. The system is intuitive, and lends itself to providing a satisfactory comfort level to the farmer.

As an example, in rolling land there could be three distinct zones. Zone I is the lowest land between the hills, where nutrients are most plentiful. This zone is typically the most productive, however may not require as much fertilizer as the balance of the field, but could benefit from an increased seeding rate. For Zone I, the crop input combination might then be:

|  | Nitrogen Fertilizer | Phosphate Fertilizer | Seed |
| --- | --- | --- | --- |
| Combination I | 60 lb/ac | 20 lb/ac | 100 b/ac |

Zone II is the mid-slope of the field, between the lowest areas and the hilltops. In conventional application, this is typically the "average" area that is used to determine the crop input requirements for the entire field. For Zone II the crop input combination might then be:

|  | Nitrogen Fertilizer | Phosphate Fertilizer | Seed |
| --- | --- | --- | --- |
| Combination II | 80 lb/ac | 25 lb/ac | 80 b/ac |

Zone III is the highest ground on the tops of the hills, generally the poorest land in the field and containing the least nutrients. This land might benefit from increased fertilizer application, but could also benefit from a decreased seeding rate such that plant populations are reduced. For Zone III the crop input combination might then be:

|  | Nitrogen Fertilizer | Phosphate Fertilizer | Seed |
| --- | --- | --- | --- |
| Combination III | 100 lb/ac | 30 lb/ac | 60 b/ac |

As the seeder moves through the field, the farmer can visually determine the boundary between zones, and manually move a selector switch from one position to the next. Crop input requirements in a field change substantially continuously, so that adjacent zones require an incremental step up or down in any particular crop input rate. This characteristic dictates that the selector switch positions be adjacent to each other and correspond to the zones. In the present example, throughout the field there will be an area of Zone II between every Zone I and Zone III. Thus the selector switch positions are arranged so that the Zone II position is between the positions for Zone 1 and Zone III.

The selector switch is typically set up to move either rotationally or linearly. Such a set-up is intuitive and allows the switch to be conveniently located where the farmer can comfortably keep his hand on it. Moving the switch in one direction changes the selected combination to that for a higher numbered zone, while moving in the opposite direction changes the selected combination to that for a lower numbered zone. The movement is intuitive.

Alternatively, other switches could be used. For instance there could be a separate button for each zone, such that while moving through Zone I, a button "I" is activated, and when crossing into Zone II, the farmer pushes a button "II", which causes button "II" to be activated and button "I" to be deactivated. Such an arrangement of a plurality of buttons would however require the farmer to look at which button he is pushing. A toggle switch could also be moved successively in one direction to progressively change to higher numbered zones and in the opposite direction to change progressively to lower numbered zones. Other switching arrangements are known in the art that would allow the farmer to change from one combination to another with a single action.

The application rate of each crop input would typically be displayed on the seeder monitor, along with an indication of the zone number corresponding to the displayed combination of rates.

Once a farmer is comfortable with two or three zones, the system could readily allow for introduction of a fourth zone and then a fifth or more. Generally speaking, the change in the application rate for each crop input will be such that adjacent zones require increasing steps in the application rate of some crop inputs and decreasing steps in the application rate of others, however the controls can readily adjust the metering devices to apply any available application rate in any order.

Where there are five zones, there will always be a Zone II between Zone I and Zone III, and there will always be a Zone III between Zone II and Zone IV, and there will always be a Zone IV between Zone III and Zone V. The distance between zone boundaries can vary greatly however the order will remain the same. Thus the selector switch will have corresponding positions for each zone arranged in that order.

As the farmer moves around the field, for example starting in Zone III, he might move the selector switch from the initial position Combination III, to IV-III-II-III-IV-V-IV-V-IV-III-II-I-II-III and be back where he started.

This invention combined with a farmer's farming knowledge and experience can produce crop production efficiency increases approaching those of a full GPS controlled system without all of the complexity and up front analysis required.

Typically, the farmer enters the desired combination of crop inputs for each zone in a central computer located in the tractor cab such that the combination for each zone is selected by moving a selector switch connected to the computer from one position to an adjacent position as he moves from one zone to another, using visual boundary determinations. The boundary will be approximate, however the method will provide a distinct increase in production efficiency.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic top view of a field where the method of the invention can be practiced;

FIG. 2 is a schematic view of an apparatus for practicing the invention;

FIG. 3 is a front view of an alternate single action selector switch;

FIG. 4 is a front view of a single action control comprising a plurality of selector buttons.

DETAILED DESCRIPTION OF THE ILLUSTRATED EMBODIMENTS

FIG. 1 schematically illustrates a typical field where the method of the invention will be used. The method allows a farmer to apply a selected first combination of application rates of each of a plurality of crop inputs on a first zone in a field with a seeding implement, and apply a selected second combination of application rates of each of the crop inputs on a second zone in the field. If desired a selected third combination of application rates of each of the crop inputs can be applied on a third zone in the field, and further zones can be added as well. The seeding implement carries a plurality of crop inputs and includes a metering device for each crop input that is adjustable to vary the application rate of the respective crop input.

As illustrated, a field is divided into Zones I, II, and III by the farmer according to his own knowledge of how the land varies in the field. The zones will not likely ever be drawn out as shown, but rather as the farmer moves through the field with a seeding implement, he judges when he has crossed an estimated boundary from soil having the characteristics of one zone, to soil having the characteristics of another zone. Generally speaking the soil characteristics will vary continuously such that the transition from one zone to the next is not well defined, however an experienced farmer will be able to approximate the boundary close enough to make a considerable improvement in production efficiency.

In many cases in rolling land, the zones will generally follow the relative elevation of the land. For instance, in the illustrated field, the lowest land between rising slopes on each side is Zone I, the land on the mid-slopes is Zone II, and the land on the hill tops is Zone III. Soil characteristics also often vary without respect to relative elevation, moving from a clay loam to sandy loam or the like as you move along the field. Farmers are knowledgeable about these variations after years of experience, and can visually make useful approximations of zone boundaries which result from a variety of soil conditions. Whatever the change in soil characteristics, except perhaps in some very exceptional circumstances, the soil characteristics vary continuously such that, as illustrated in FIG. 1, at all parts of the field, Zone II lies between Zones I and II. Similarly where the field was divided into four zones, the transition of soil characteristics will be such that at all parts of the field Zone III will lie between Zones II and IV.

Often with advice from an agronomist, and based on his own experience, bolstered by current and historic soil tests, historic yield data, and such other information as is available, the farmer chooses a combination of application rates for seed, fertilizer, herbicides, or other crop inputs that is appropriate for the soil characteristics of each zone.

The following table shows an example of combinations that could be appropriate for Zones I, II, and III in the field illustrated in FIG. 1.

|  | Nitrogen Fertilizer | Phosphate Fertilizer | Seed |
|---|---|---|---|
| Combination I (Zone I) | 50 lb/ac | 20 lb/ac | 100 lb/ac |
| Combination II (Zone II) | 75 lb/ac | 25 lb/ac | 80 lb/ac |
| Combination III (Zone III) | 90 lb/ac | 30 lb/ac | 60 lb/ac |

To practice the method of the invention, as illustrated in FIG. 1 the farmer, starting at starting point XS, tows the seeding implement along Path X through Zone I in the field with the metering devices adjusted to apply Combination I of application rates, ie. 50 lb/ac of nitrogen fertilizer, 20 lb/ac of phosphate fertilizer, and 100 lb/ac of seed. As the seeding implement moves through the field, the farmer will visually judge when the seeding implement crosses the boundary from Zone I to Zone II, and, by performing a single action, adjust the metering devices to apply Combination II of application rates, ie. 75 lb/ac of nitrogen fertilizer, 25 lb/ac of phosphate fertilizer, and 80 lb/ac of seed, on Zone II.

As the seeding implement continues moving along Path X in the field, it crosses a boundary back into Zone I, where the farmer performs a single action to change to Combination I, and then from Zone I again into Zone II, where he changes to Combination II.

As another example, starting at YS and moving along Path Y, the farmer will visually judge when the seeding implement crosses a boundary from Zone I to Zone II, and, by performing a single action, adjusts the metering devices to apply Combination II on Zone II. As the seeding implement continues to move through the field, the farmer will visually judge when the seeding implement crosses a boundary from Zone II to Zone III, and, by performing a single action, adjusts the metering devices to apply Combination III of application rates, ie. 90 lb/ac of nitrogen fertilizer, 30 lb/ac of phosphate fertilizer, and 60 lb/ac of seed, on Zone III. As the seeding implement continues to move through the field, the farmer judges the boundary from Zone III to Zone II, and then Zone II to Zone I, and Zone I to Zone II, changing to the appropriate combination for each zone as he goes, each time using a single action.

Again, starting at ZS and moving along Path Z, the seeding implement begins the pass applying Combination II on Zone II. The farmer visually judges when the seeding implement crosses a boundary from Zone II to Zone III. Again as the seeding implement continues to move through the field, the farmer judges the boundary from Zone III to Zone II, and then to Zone I-Zone II-Zone III-Zone II-Zone I, again changing to the appropriate combination for each zone as he goes, each time using a single action.

The single action adjusting the metering devices to apply each of Combination I, II, or III are both performed on a single selector switch 3, such as is illustrated in FIGS. 2 and 3. FIG. 2 illustrates a rotary switch 3R and FIG. 3 illustrates a linear switch 3L. In either case, the single action comprises moving the selector switch from a first switch position, indicated as "I", for applying Combination I, to an adjacent second switch position, indicated as "II", for applying Combination II when moving from Zone I to the Zone II. The single action comprises moving the selector switch 3 from the second switch position "II" to an adjacent third switch position, indicated as "III", for applying Combination III when moving from Zone II to Zone III.

In both the rotary and linear switches 3R, 3L, the third switch position "III" is located relative to the second switch position "II" in a direction opposite the first switch position "I". Thus the movement from the second switch position "II" to the third switch position "III" is in the same direction as the movement of the selector switch from the first switch position "I" to the second switch position "II". The "up" and "down" movement is intuitive and allows the farmer to move through the field confidently.

Alternatively, as illustrated in FIG. 4, the single action adjusting the metering devices to apply Combination I and the single action adjusting the metering devices to apply Combination II can be performed on different selector buttons 5. While moving through Zone I, button 5-I is activated, and when crossing into Zone II, the farmer pushes a button 5-II, which causes button 5-II to be activated and button 5-I to be deactivated. Such an arrangement of a plurality of buttons 5 would however require the farmer to look at which button 5 he is pushing.

As illustrated in FIGS. 3 and 4, a different colored light 7 can be provided for each selector switch position such that the lights 7 are on only when the selector switch 3 is in a switch position corresponding to the respective light 7. Intuitively, for the example above, switch position II, applying Combination II would be green. The higher fertilizer rate of Combination III corresponding to switch position III would be red, and the lower fertilizer rate of Combination I corresponding to switch position I would be yellow. Where more than three zones are present, the lights could have other colors. Alternatively for five zones for example, in order to keep the intuitive color scheme, green could be the middle switch position III, with higher position IV constant red and highest position V blinking red. The lower position II could be constant yellow, and the lowest position I blinking yellow. Other such arrangements of lights could be used as well. Such lights 7 would facilitate working at night.

Whichever switch or button arrangement is used, it could be located conveniently to the farmer's hand, or where the farmer can comfortably keep his hand on the switch.

FIG. 2 schematically illustrates an apparatus for practicing the method of the invention. The seeding implement 9 carries three crop inputs A, B, and C in three tanks 11A, 11B, and 11C. Metering devices 12A, 12B, 12C are provided for each crop input and each metering device is adjustable to vary the application rate of the respective crop input. A central computer 10, typically located in the tractor cab, controls the metering devices and thus the application rate of each crop input. The farmer stores the information for the combinations of application rates of crop inputs in the computer 10. The selector switch 3 is connected to the computer 10 and selects which of the stored combinations is to be applied.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A method of applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the method comprising:

towing the seeding implement through the first zone in the field with the metering devices adjusted to apply the first combination of application rates;

visually judging when the seeding implement crosses a first boundary from the first zone to the second zone; and by performing a single action, adjusting the metering devices to apply the second combination of application rates on the second zone;

visually judging when the seeding implement crosses the first boundary from the second zone to the first zone; and by performing a single action, adjusting the metering devices to apply the first combination of application rates on the first zone;

towing the seeding implement through the second zone in the field with the metering divices adjusted to apply the second combination of application rates;

visually judging when the seeding implement crosses a second boundary from the second zone to third zone; and by performing a single action, adjusting the metering devices to apply the third combination of application on the third zone;

wherein the single action to adjust the metering devices to apply the second combination of application rates, and the single action adjust the metering devices to apply the third combination of application rates, are both performed by an operator moving a single selector switch.

2. The method of claim 1 wherein the single action comprises moving the selector switch from a first switch position for applying the first combination to an adjacent second switch position for applying the second combination when moving from the first zone to the second zone.

3. The method of claim 2 wherein the single action comprises moving the selector switch from the second switch position to an adjacent third switch position for applying the third combination when moving from the second zone to the third zone.

4. The method of claim 3 wherein the movement from the second switch position to the third switch position is in the same direction as the movement of the selector switch from the first switch position to the second switch position.

5. The method of claim 3 wherein the third switch position is located relative to the second switch position in a direction opposite the first switch position.

6. The method of claim 1 further comprising providing a light corresponding to at least one selector switch position such that the light is on only when the selector switch is in a switch position corresponding to the respective light.

7. The method of claim 6 comprising providing a different colored light for each of two selector switch positions.

8. The method of claim 7 wherein at least one light blinks when on.

9. The method of claim 6 wherein at all parts of the field, the second zone lies between the first and third zones.

10. A method of applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the method comprising:

towing the seeding implement through the first zone in the field with the metering devices adjusted to apply the first combination of application rates on the first zone;

visually judging when the seeding implement crosses a first boundary from the first zone to the second zone;

moving a selector switch from a first switch position to an adjacent second switch position to adjust the metering devices to apply the second combination of application rates on the second zone;

visually judging when the seeding implement crosses a second boundary from the second zone to the third zone;

moving a selector switch from the second switch position to an adjacent third switch position to adjust the metering devices to apply the third combination of application rates on the third zone;

providing a light corresponding to at least one selector switch position such that the light is on only when the selector switch is in a switch position corresponding to the respective light.

11. The method of claim 10 comprising providing a different colored light for each of two selector switch positions.

12. The method of claim 11 wherein at least one light blinks when on.

13. An apparatus for applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the apparatus comprising:

a selector switch operative to adjust the metering devices, the selector switch movable from a first switch position wherein the metering devices are adjusted to apply the first combination of application rates, to an adjacent second switch position wherein the metering devices are adjusted to apply the second combination of application rates, and movable from the second switch position to an adjacent third switch position wherein the metering devices are adjusted to apply the third combination of application rates; and a light corresponding to at least one selector switch position such that the light is on only when the selector switch is in a switch position corresponding to the respective light.

14. The apparatus of claim 13 comprising a different colored light for each of two selector switch positions.

15. The apparatus of claim 14 wherein at least one light blinks when on.

16. A method of applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the method comprising:

towing the seeding implement through the first zone in the field with the metering devices adjusted to apply the first combination of application rates on the first zone;

visually judging when the seeding implement crosses a first boundary from the first zone to the second zone;

moving a selector switch from a first switch position to an adjacent second switch position to adjust the metering devices to apply the second combination of application rates on the second zone;

visually judging when the seeding implement crosses a second boundary from the second zone to the third; and moving the selector switch from the second switch position to an adjacent third switch position to adjust the metering devices to apply the third combination of application rates on the third zone;

wherein the movement from the second switch position to the third switch position is in the same direction as the movement of the selector switch from the first switch position to the second switch position.

17. The method of claim 16 wherein at all parts of the field, the second zone lies between the first and third zones.

18. A method of applying a selected first combination of application rates of each of a plurality of crop inputs on a first zone in a field with a seeding implement, and applying a selected second combination of application rates of each of the crop inputs on a second zone in the field with the seeding implement, the seeding implement carrying a plurally of crop inputs and including a metering devices for each crop inputs that is adjustable to vary the application rates of the respective crop inputs, the method comprising:

towing the seeding implement through the first zone in the field with the metering devices adjusted to apply the first combination of application rates;

visually judging when the seeding implement crosses a first boundary from the first zone to the second zone; and by performing a single action, adjusting the metering devices to apply the second combination of application rates on the second zone;

visually judging when the seeding implement crosses the first boundary from the second zone to the first zone; and by performing a single action, adjusting the metering devices to apply the first combination of application rates on the first zone;

wherein the single action adjusting the metering devices to apply the first combination of application rates and the single action adjusting the metering devices to apply the second combination of application rates are both performed on a single selector switch.

19. A method of applying a selected first combination of application rates of each of a plurality of crop inputs on a first zone in a field with a seeding implement, and applying a selected second combination of application rates of each of the crop inputs on a second zone in the field with the seeding implement, the seeding implement carrying a plurality of crop inputs and including a metering device for each crop input that is adjustable to vary the application rate of the respective crop input, the method comprising:

towing the seeding implement through the first zone in the field with the metering devices adjusted to apply the first combination of application rates;

visually judging when the seeding implement crosses a first boundary from the first zone to the second zone; and by performing a single action, adjusting the metering devices to apply the second combination of application rates on the second zone;

visually judging when the seeding implement crosses a first boundary from the second zone to the first zone; and and by performing a single action, adjusting the metering devices to apply the first combination of application rates on the first zone;

wherein the single action adjusting the metering devices to apply the first combination of application rates and the single action adjusting the metering devices to apply the second combination of application rates are performed on different selector buttons.

20. A method of applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the method comprising:

towing the seeding implement through the first zone in the field with the metering devices adjusted to apply the first combination of application rates on the first zone;

visually judging when the seeding implement crosses a first boundary from the first zone to the second zone;

moving a selector switch from a first position to an adjacent second switch position to adjust the metering devices to apply the second combination of application rates on the second zone;

visually judging when the seeding implement crosses a second boundary from the second zone to the third zone; and moving the selector switch from the second switch position to an adjacent third switch position to adjust the metering devices to apply the third combination of application rates on the third zone;

wherein the third switch position is located relative to the second switch position in a direction opposite the third switch position.

21. An apparatus for applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the apparatus comprising:

a selector switch operative to adjust the metering devices, the selector switch movable from a first switch position wherein the metering devices are adjusted to apply the first combination of application rates, to an adjacent second switch position wherein the metering devices are adjusted to apply the second combination of application rates, and movable from the second switch position to an adjacent third switch position wherein the metering devices are adjusted to apply the third combination of application rates;

wherein the movement from the second switch position to the third switch position is in the same direction as the movement of the selector switch from the first switch position to the second switch position.

22. An apparatus for applying a selected first combination of application rates of each of a plurality of crop inputs on a first zone in a field with a seeding implement, and applying a selected second combination of application rates of each of the crop inputs on a second zone in the field with the seeding implement, and applying a selected third combination of application rates of each of the crop inputs on a third zone in the field with the seeding implement, the seeding implement carrying a plurality of crop inputs and including a metering device for each crop input that is adjustable to vary the application rate of the respective crop input, the apparatus comprising:

a selector switch operative to adjust the metering devices, the selector switch movable from a first switch position wherein the metering devices are adjusted to apply the first combination of application rates, to an adjacent second switch position wherein the metering devices are adjusted to apply the second combination of application rates, and movable from the second switch position to an adjacent third switch position wherein the metering devices are adjusted to apply the third combination of application rates;

wherein the third switch position is located relative to the second switch position in a direction opposite the first switch position.

\* \* \* \* \*